Figure 1:
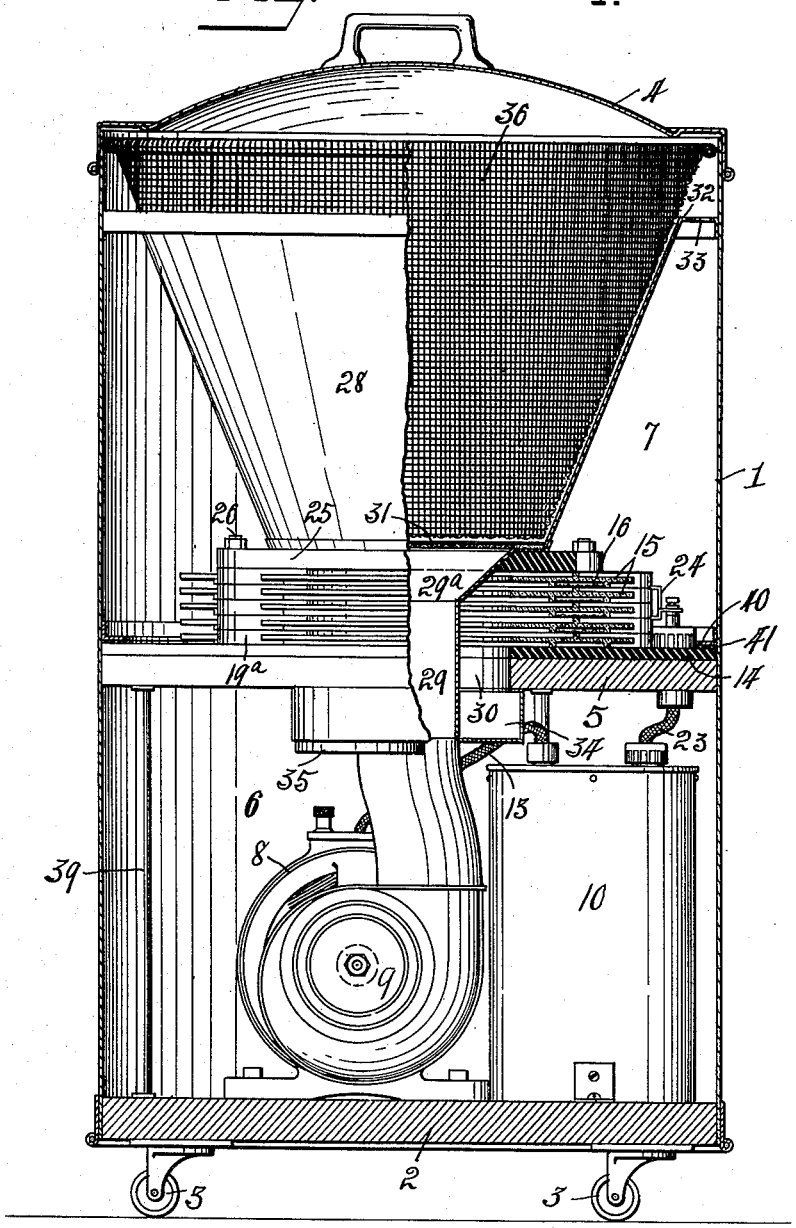

F. E. BLANCHARD.
OZONIZING AND STERILIZING APPARATUS.
APPLICATION FILED DEC. 23, 1912.

1,096,991.

Patented May 19, 1914.
3 SHEETS—SHEET 1.

WITNESSES:
C. H. Bills.
D. C. Walter

INVENTOR.
Frank E. Blanchard,
By Owen & Owen,
His attys.

F. E. BLANCHARD.
OZONIZING AND STERILIZING APPARATUS.
APPLICATION FILED DEC. 23, 1912.

1,096,991.

Patented May 19, 1914.
3 SHEETS—SHEET 2.

WITNESSES:
C. H. Bills.
D. C. Walter.

INVENTOR.
Frank E. Blanchard,
By Owen & Owen,
His attys.

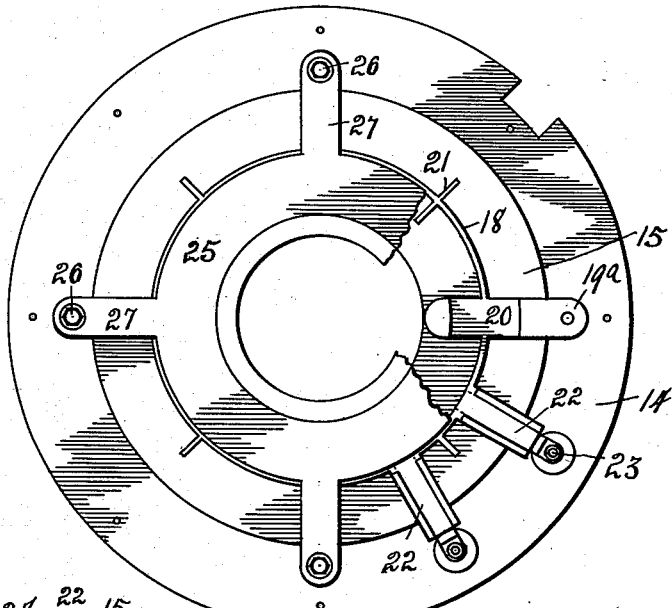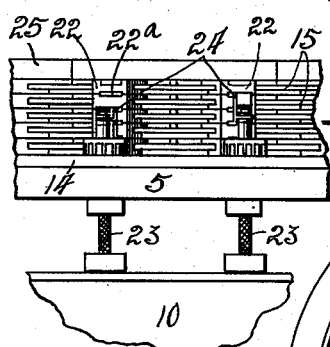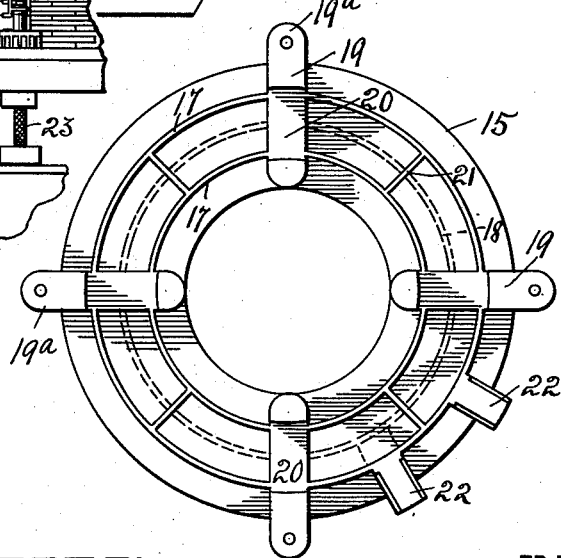

UNITED STATES PATENT OFFICE.

FRANK E. BLANCHARD, OF TOLEDO, OHIO, ASSIGNOR OF ONE-HALF TO FRANK H. SCHROEDER, OF TOLEDO, OHIO.

OZONIZING AND STERILIZING APPARATUS.

1,096,991.  Specification of Letters Patent.  Patented May 19, 1914.

Application filed December 23, 1912. Serial No. 738,369.

*To all whom it may concern:*

Be it known that I, FRANK E. BLANCHARD, a citizen of the United States, and a resident of Toledo, in the county of Lucas and State of Ohio, have invented a certain new and useful Ozonizing and Sterilizing Apparatus; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to apparatus for the conversion of oxygen into ozone by electrical action, and has particular reference to the utilization of ozone for sterilizing, germicidal and oxidizing purposes.

The primary object of my invention is the provision of an apparatus of this character, which is adapted for use in banking houses for the sterilizing and deodorizing particularly of paper money, in hospitals for the sterilizing of bandages, wearing apparel, etc., and for use in any other connection or purpose for which it may be appropriate.

A further object of the invention is the provision, in an apparatus of this class, of a circulatory system, which is adapted to cause ozonized air within the apparatus to repeatedly circulate through articles therein to be rendered sterile then back through the ozonizer and air circulating means after which it is again forced through the chamber containing the articles, in such manner that the ozonized air is used over and over and repeatedly brought in close and intimate contact with the articles within the sterilizing chamber, whereby the chemical effect of the gas will be fully utilized.

A further object of the invention is the provision of an ozonizer, which is so constructed that the air in passing through it will receive the full benefit of the silent electrical discharge which the high tension current produces, and will at the same time serve to carry off the heat generated by the ozonizer, which heat is easily radiated on account of the small area of contact between the electrodes and the dielectrics. So far as I am aware, little attention has heretofore been given to this heating problem other than to provide artificial cooling means in large generators, and, as the presence of such heating lowers the electrical efficiency in the apparatus, the ease of heat radiation, which is made possible by the construction of my apparatus, is a highly important feature.

A further object of the invention is the provision in an apparatus of this character of means for preventing a diminution of pressure within the sterilizing chamber by reason of the peculiar chemical action which takes place during the sterilizing process.

Further objects and advantages of the invention will be apparent from the following detailed description.

Figure 2:
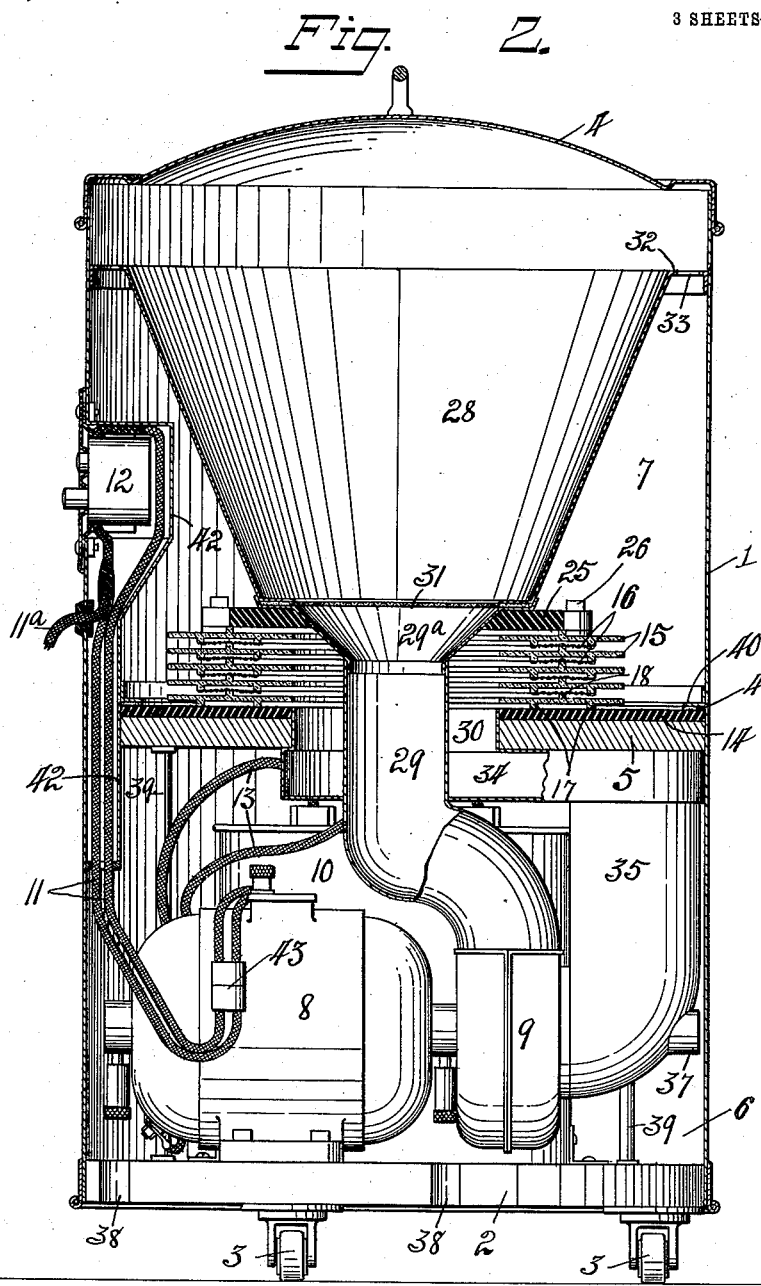

The invention is fully described in the following specification, and while, in its broader aspect, it is capable of embodiment in numerous forms, a preferred embodiment thereof is illustrated in the accompanying drawings, in which, Figure 1 is a vertical section of an apparatus embodying the invention with a portion of the interior parts in full. Fig. 2 is a central vertical section of the apparatus taken substantially at right angles to the section in Fig. 1, with the article carrying basket removed. Fig. 3 is an enlarged top plan view of the ozonizer with a portion of the top insulating ring broken away. Fig. 4 is an enlarged bottom view of one of the dielectric plates, and Fig. 5 is an elevation of a portion of the lead connecting side of the ozonizer.

Referring to the drawings, 1 designates a case which is preferably, but not necessarily, of cylindrical form, and is carried by a base member 2 that is mounted, in the present instance, on casters 3. The case 1 has its top open and adapted to be closed in a substantially air tight manner by a removable cover 4. The interior of the case 1 is divided by a horizontally disposed partition 5 into a lower compartment 6 and an upper compartment 7 having its top closed by the cover 4.

Mounted within the lower compartment 6 of the apparatus is an electric rotary converter 8, a blower 9, the fan or rotor of which is carried by the converter shaft, and a transformer 10. The electrical leads to the converter are designated 11, and are disposed in circuit with a switch that is carried by the casing 1 at one side thereof and from which a lead 11ᵃ extends without the case and to any suitable point for attaching to a source of electrical supply, as to an electric lamp socket. Leads 13, 13 extend from the converter to the primary of the customary transformer 10, as is well understood in the art. If the apparatus is used in connection with an alternating current a motor is substituted for the converter.

The ozonizer of the apparatus is mounted on the top of the partition 5 being insulated therefrom by any suitable form of insulation 14, and being shown, in the present instance, as comprising a plurality of dielectric plates or rings 15, which are placed one upon another in a manner to provide air spaces therebetween and have screen-like electrodes 16 disposed therebetween through which the air is required to pass one or more times in its passage through the spaces between the dielectric plates. The air or oxygen in its passage through the spaces between the dielectric plates is converted into ozone by the silent electrical discharge from the electrodes 16, as is well understood in the art. The dielectric plates 15, which are of ring form to provide a central opening through the ozonizer and composed of glass or other suitable non-conductor, are preferably of duplicate construction and each is provided on one side thereof, the bottom in the present instance, with two radially spaced concentric annular ribs or ridges 17, 17 (see Fig. 4), and on the opposite or top side thereof with a single annular rib 18, which is disposed midway between the ribs 17, 17 in concentric relation thereto. Each dielectric plate is also provided at spaced intervals therearound, in directly opposite relation to each side thereof, with radially raised surfaces or arms 19 which extend from adjacent to the inner edge of the plate to beyond the outer edge thereof to form radially projecting ears 19ᵃ at the outer edge of the plate. The raised surfaces or arms 19 are intended to rest upon the corresponding surfaces of the subjacent plates to maintain the plates in properly spaced relation, as indicated in Figs. 1 and 2, and are recessed intermediate their ends at each side of the plate, as at 20, to provide spaces in which the respective electrodes 16 are disposed. The electrodes 16, which are preferably of ring form and composed of metal screening or some perforate material suitable for the passage of electricity therethrough, are interposed between the ribs 17, 17 of one plate and the single rib 18 of the adjoining plate, having contact with each of such ribs, whereby the air in its passage between the plates is caused to take an undulatory course and to pass at least twice through an electrode, thus materially facilitating the silent discharge of electricity into the air. The dielectric plates are preferably provided on each side thereof with spaced radially disposed ribs 21 which connect the ridges 17, 17 at one side of the plate and extend across the ridge 18 at the opposite side of the plate. Each dielectric plate 15 is also provided in suitable position thereon with a pair of oppositely thickened radial extensions 22, which are radially channeled on opposite sides thereof to adapt them when the plates are built up one over another to coöperate to form radial passages, as shown at 22ᵃ in Fig. 5, through which leads to the electrodes are intended to pass. The transformer 10 has two leads 23 extending from the secondary thereof up through the partition 5, and each has a branch connection 24 with alternate electrodes, whereby four electrodes are in circuit with the transformer. When the dielectric plates 15 and the electrodes 16 have been built up one above another to any desired number, a top insulating ring or member 25 is placed over the upper dielectric plate, and the whole is firmly secured to the platform or partition 5 by screws or bolts 26 which extend through apertures in ears 27 projecting radially from the member 25, and through registering apertures in the ears 19ᵃ of the dielectric plates. It is apparent with this construction of ozonizer that the air currents in passing through the spaces between the dielectric plates are caused to take an undulatory course and to pass a plurality of times through the electrodes 16 whereby a thorough ozonization of the air is effected. While the elements of the ozonizer are preferably disposed in reclining position or built one upon another, it is evident that they may be arranged in any other manner, as desired, without departing from the spirit of the invention.

Mounted within the upper compartment 7 of the casing is a receptacle 28 forming a sterilizing chamber, and, in the present instance, being of tapered or conical form with its small end resting upon the insulating member 25 at the edge of the central opening provided therethrough. The interior of the receptacle 28 has communication through a bottom opening and pipe or conduit 29 with the outlet of the blower 9, whereby the air delivered from the blower is directed up into the receptacle. The pipe 29 projects down through the opening provided through the central portion of the ozonizer and through a registering opening 30 in the partition 5, being of less diameter than said openings to provide an air space therearound, and has its upper end preferably flared outwardly or of funnel shape, as shown at 29ᵃ, to connect with the bottom opening of the receptacle which is preferably larger than the pipe 29. A screen or perforated diaphragm 31 is disposed across the bottom opening of the receptacle to prevent loose articles from falling into the pipe 29. The upper open end of the receptacle 28 is of less diameter than the compartment 7 and is provided with a radial flange 32 which extends to and contacts with the adjacent wall of said compartment to serve to brace the receptacle therein. The flange 32 is provided therearound with spaced openings 33 through which the air passes from the upper part of the receptacle 28 down into the portion of the compartment 7 which surrounds said receptacle, and thence passes inwardly through the ozonizer to the interior opening or passage thereof. An air conduit 34 connects with the under side of the opening 30 in the partition 5 and opens communication between such opening and a down pipe 35 leading to the intake of the blower 9. It is thus apparent that the air which is ozonized by its passage through the electrodes 16 between the dielectrics 15 passes through the opening 30, conduits 34 and 35 to the blower and is thence delivered by the blower through the pipe into the receptacle 28 where it is utilized to again sterilize articles disposed within the receptacle. For convenience in placing articles within or removing them from the receptacle 28 a wire basket 36 is adapted to be removably placed within the receptacle 28. Any number of the baskets 36 may be provided so that articles may be placed in one without the apparatus while another basket containing articles to be sterilized is disposed within the apparatus.

Ozone differs chemically from atmospheric oxygen in that the molecule of the latter is composed of two atoms while the ozone molecule consists of three atoms of oxygen. Ozone is an endothermic compound, 36.2 calories of heat being absorbed in its formation from oxygen. For this reason, ozone is very unstable and reverts readily into ordinary oxygen, during which change, one atom of the oxygen is set free, together with 36.2 calories. The oxygen thus liberated is in a nascent condition and performs oxidations with greater ease and rapidity than ordinary oxygen. It is this characteristic which gives ozone its great sterilizing and germicidal powers. As the electric action changes the oxygen into ozone, a decrease in the volume of the gas becomes evident, due to the fact that the ozone molecule occupies the same space as the oxygen molecule. When the apparatus is in operation therefore, a partial vacuum occurs within the upper compartment 7 of the receptacle, thus rendering it necessary to maintain such upper compartment substantially air tight during said operation, in order to prevent a suction of air directly into such compartment. To overcome the loss of pressure which is occasioned by such action, the pipe or conduit 35 which leads to the intake of the blower 9, is provided with an auxiliary inlet 37 through which air may be admitted to said conduit from the compartment 6, which compartment has communication with the atmosphere through openings 38 in the bottom member of the apparatus, or in any other suitable manner. Any other suitable means may be provided, however, for maintaining a substantially uniform pressure within the sterilizing chamber.

It is found in practice that while it is not absolutely necessary to render the compartment 7 air tight and to provide an auxiliary air inlet for air to the blower 9, it is preferable for efficient work and is considered quite an important feature of the apparatus.

For convenience in getting at the converter or other inclosed parts of the apparatus for repair or any other desired purpose, the casing 1 is preferably slipped down over the apparatus and removably fitted at its base around the base member 2, the partition 5 which carries the ozonizing apparatus being fixedly carried by posts 39 which extend upward from the base member 2. When the casing 1 is in place it has a close sliding fit around the partition 5 and the top marginal flange 22 of the receptacle 28 and in order to render the compartment 7 substantially air tight, the casing is provided above the marginal edge of the insulating sheet 14 with an inwardly projecting annular flange 40, which seats down on a gasket 41 on the outer marginal edge of the sheet 14. In order to protect the leading-in wires 11 and the switch 12 from static currents within the casing 1, I provide a protecting casing 42 therefor which casing is attached to the inner side of the casing 1 and coöperates therewith to inclose the switch and a considerable portion of the leading-in wires. The leading-in wires 11 are provided with a coupling-member 43 to facilitate a disconnection of such wires with the converter wires when the casing 1 is removed from the operative parts of the apparatus.

In the use of my sterilizing apparatus the articles to be sterilized are placed either directly in the receptacle 28 or in a basket 36 disposed within such receptacle, and after placing the cover 4 closely over the top opening of the casing 1 the electricity is turned into the converter 8 thereby driving such converter to operate the fan of the blower and also to generate electricity for the ozonizer which electricity passes to the transformer 10 and thence from the secondary thereof to the respective electrodes 16 of the ozonizer. The operation of the blower causes a rapid circulation of air through the receptacle 28, thence over the top thereof and down through the opening 33 and the space around the receptacle 28 to the ozonizer through which it passes and is converted into ozone, thence through the opening 30, conduits 34, 35, blower 9, conduit 29 and back into the receptacle 28 to effect a sterilizing of the articles disposed therein. This circulation and ozonizing of the air is continued so long as the converter is in operation, thus using the same air over and over so that it is successively ozonized by its passage through the ozonizing apparatus and then at least partially converted back into oxygen by its passage through the articles being sterilized.

It is evident that I have provided a simple and efficient ozonizing apparatus which is admirably adapted for use in banks for the sterilizing and deodorizing of money, for use in hospitals for the sterilizing of bandages and other articles which are commonly sterilized in such places, and for use in any other connection for which it may be adapted or appropriate. It is also evident that in an ozonizer constructed as described three dielectric plates and the interposed electrodes would constitute a generator cell, and that such cell may be built up of any number of dielectric plates and interposed electrodes as may be necessary to consume a desired amount of power. The provision on the dielectric plates of the radiating projections which coöperate in pairs to form inclosing guides for the conductor strips which connect the screen electrodes with the transformer leads is also quite an important feature of my apparatus as such guides prevent any electrical leakage, brush discharge, or short circuiting arcs on the exterior portions of the cell.

I wish it understood that my invention is not limited to any specific construction or arrangement of the parts except in so far as such limitations are specified in the claims.

Having thus described my invention, what I claim as new, and desire to secure by Letters Patent, is,—

1. In a sterilizing apparatus, a casing, ozonizing means and an article receptacle in said casing, and means for creating a continuous circulation of air through the ozonizer and receptacle and said casing.

2. In a sterilizing apparatus, an article receptacle, ozonizing means, a blower in communication with said receptacle, and an inclosing member for said parts which coöperates therewith to form a continuous circulatory system whereby air is repeatedly forced through the receptacle and ozonizer by said blower.

3. In a sterilizing apparatus, an article receptacle, an ozonizing means, a blower, and an inclosing member for said several parts coöperating therewith to form a circulatory system for the repeated passage of air through the several parts, said blower having its outlet connected to the receptacle and its inlet connected to the ozonizing means.

4. A sterilizing apparatus having an ozonizing means, an article receptacle and air circulating means, all in a common air circulating circuit, and an inclosing case therefor forming a part of the circulating circuit.

5. A sterilizing apparatus having an article receptacle, an enveloping member therefor, means for creating a circulation of fluid through said receptacle and member and an ozonizing means in the circulating circuit with said receptacle, member and first means, and auxiliary air inlet means for said first mentioned means.

6. In a sterilizing apparatus, a substantially air tight chamber, an article receptacle in said chamber having inlet and outlet openings, a blower for creating a circulation of fluid first through said receptacle and then the chamber, ozonizing means disposed in said circulatory system for ozonizing the fluid flowing through the receptacle, and means for maintaining a normal fluid pressure within said chamber and receptacle.

7. In a sterilizing apparatus, a sterilizing chamber, mechanism for generating ozone and circulating it through said chamber, and thence back to said mechanism to be again acted on thereby, means inclosing said chamber and serving to connect said chamber and mechanism to coöperate therewith to form an endless fluid circulating course, and means for preventing a reduction of pressure within said circulating course by reason of the change in density of the ozone during the sterilizing action.

8. In a sterilizing apparatus, a closed chamber, an ozone generator having a passage therethrough, a receptacle in said chamber, and a current creating means in communication with said chamber through both said generator and receptacle whereby all of said parts are in a common endless circulatory system.

9. In a sterilizing apparatus, a current creating means, a closed chamber having an opening in communication with said means, an ozone generator so placed that air must pass therethrough before its passage from said chamber through said opening, and a receptacle having communication with the interior of said chamber and with said means and forming a part of the circulatory system in which said chamber, generator and means are disposed.

10. In a sterilizing apparatus, a closed chamber having an opening in its bottom, a ring form of ozone generator disposed around said opening, a receptacle mounted above the generator within said chamber and having its top in communication with the chamber, and means for drawing air from the chamber through said generator and then forcing it through said receptacle and into said chamber.

11. In a sterilizing apparatus, a closed chamber having an opening in its bottom, a ring form of ozone generator mounted around said opening, a receptacle mounted within said chamber and having its upper portion in communication with said chamber, a blower having its intake in communication with said opening whereby air is drawn from said chamber through the generator and having its outlet extending upward through said opening and the central portion of the generator in communication with the interior of said receptacle through its bottom.

12. In a sterilizing apparatus, a closed case having a removable cover and divided into upper and lower compartments, an ozone generator and a receptacle in said upper compartment, both in communication therewith, and current creating means disposed in said lower compartment and having inlet and outlet passages which coöperate with said chamber, generator and receptacle to provide an endless circulatory system.

13. In a sterilizing apparatus, a base member, a platform elevated above and carried by said base member, a casing removably fitting over said base member and platform to coöperate therewith to form upper and lower compartments, a receptacle disposed within the upper compartment with its upper end in communication therewith, a draft creating means disposed within the lower compartment and adapted to draw air from the upper compartment and force it through said receptacle and back into the upper compartment, and an ozone generator disposed to ozonize air in its passage from the upper compartment to said means.

14. In a sterilizing apparatus, a closed chamber having a removable cover, a receptacle disposed in said chamber and having an open top in communication therewith, a removable article carrying basket fitting within said receptacle, an ozone generator, and means for creating a circulation of air through said chamber, generator and receptacle and the basket disposed therein.

In testimony whereof, I have hereunto signed my name to this specification in the presence of two subscribing witnesses.

FRANK E. BLANCHARD.

Witnesses:
FRANK H. SCHROEDER,
C. W. OWEN.